(Model.)
5 Sheets—Sheet 2.
G. H. LITTLE.
COMBINED INJECTOR AND EJECTOR.
No. 272,448. Patented Feb. 20, 1883.
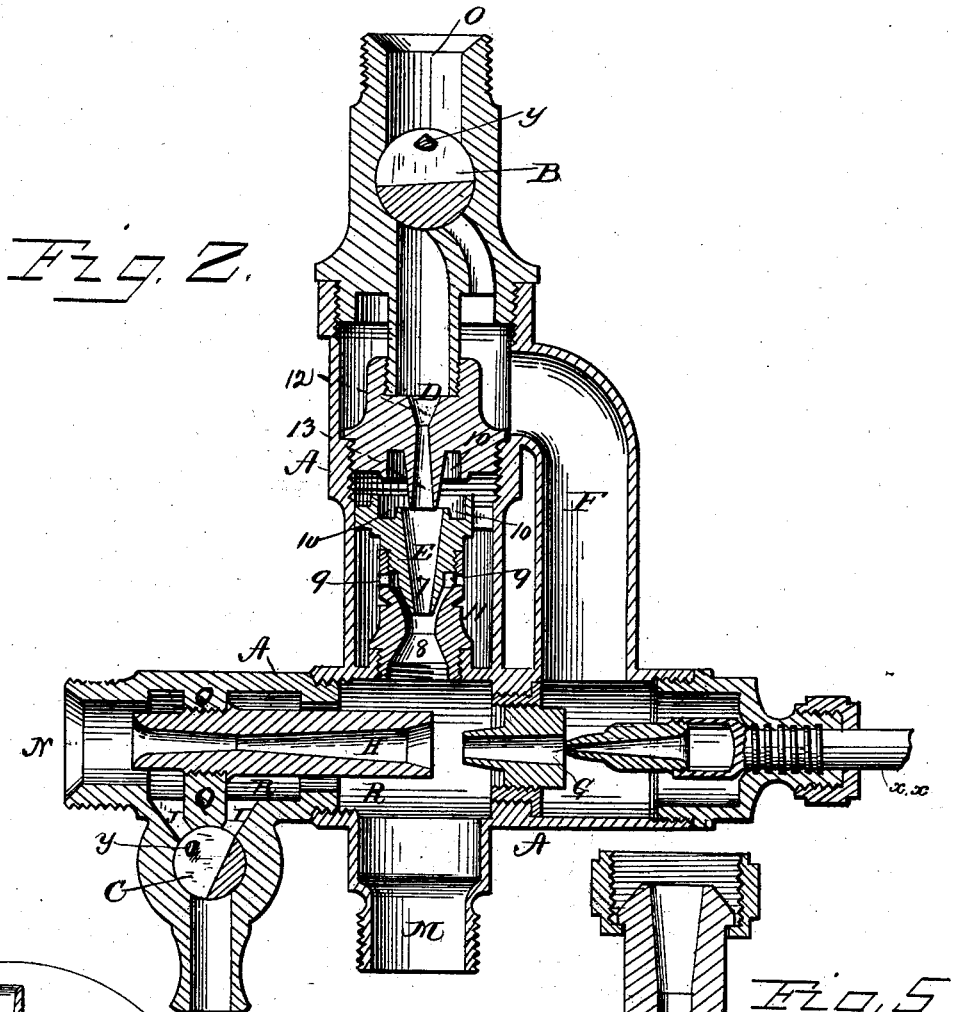
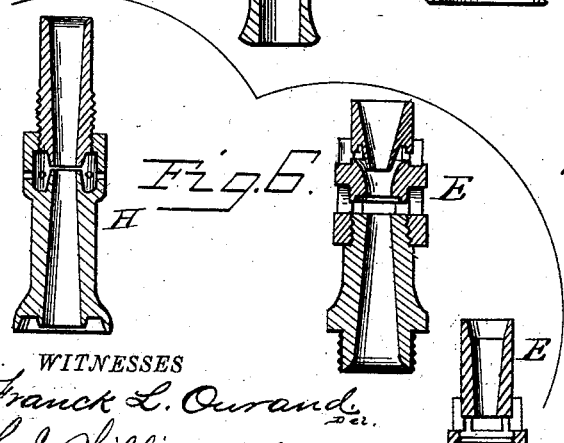
WITNESSES
Franck L. Ourand.
C. J. Williamson.
INVENTOR
George H. Little
by John J. Halsted & Son
his Attorneys

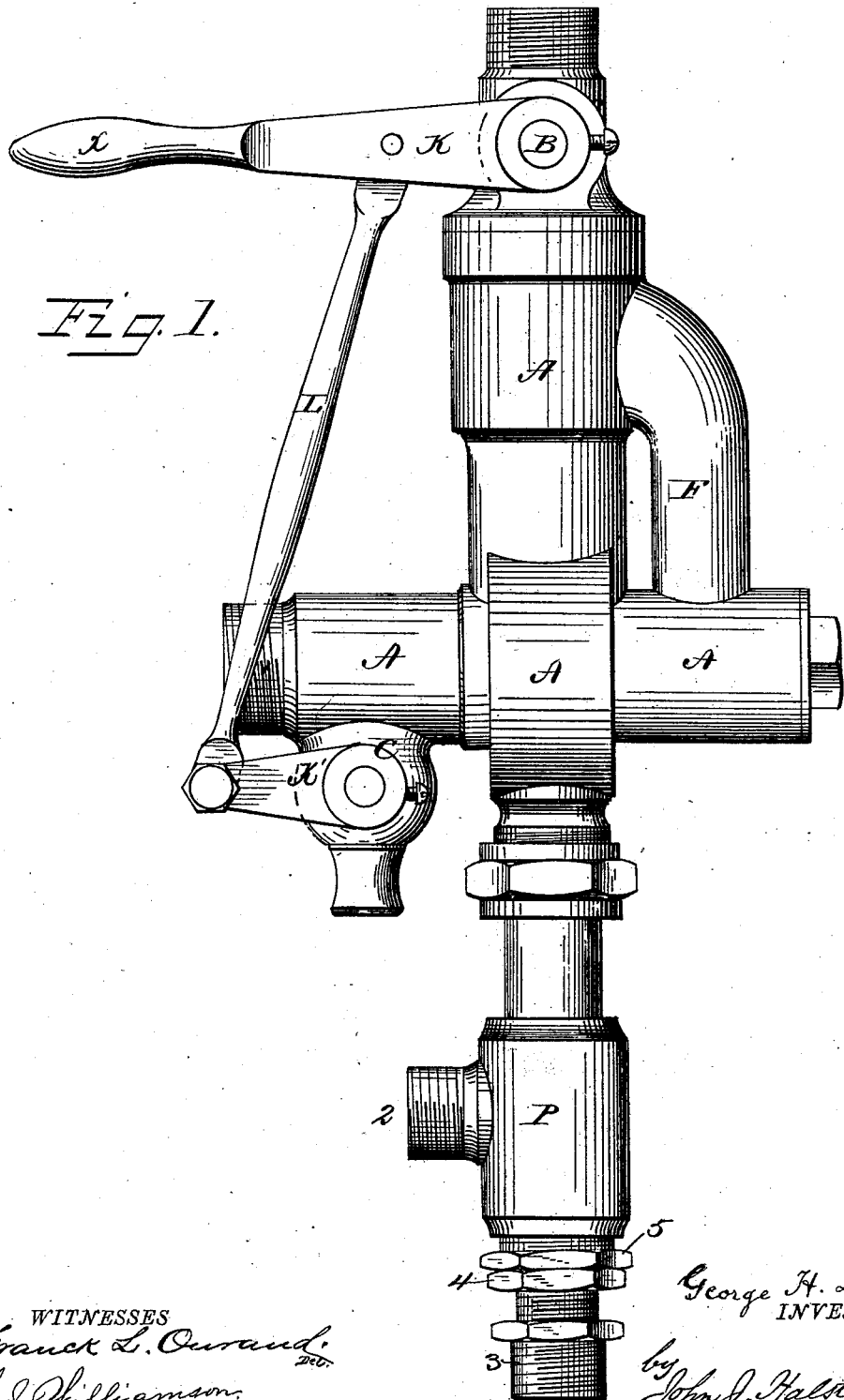

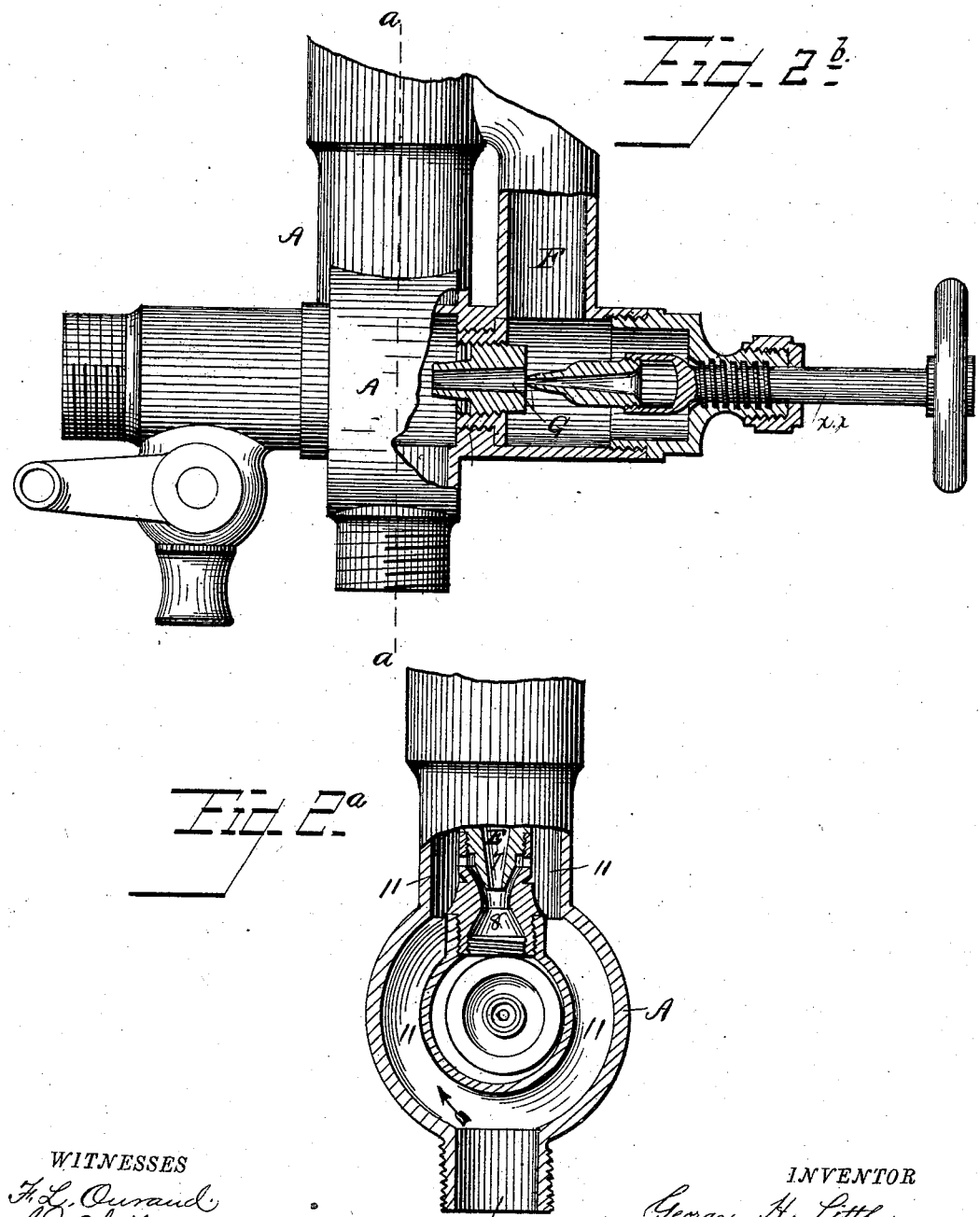

(Model.)

5 Sheets—Sheet 4.

G. H. LITTLE.
COMBINED INJECTOR AND EJECTOR.

No. 272,448. Patented Feb. 20, 1883.

WITNESSES
Franck L. Ourand
C. J. Williamson

George H. Little
INVENTOR by John J. Halsted & Son
his Attorneys (Model.) 5 Sheets—Sheet 5.

G. H. LITTLE.
COMBINED INJECTOR AND EJECTOR.

No. 272,448. Patented Feb. 20, 1883.

WITNESSES
Franck L. Ourand
C. J. Williamson

George H. Little
INVENTOR
by
John J. Halsted & Son
his Attorneys

UNITED STATES PATENT OFFICE.

GEORGE H. LITTLE, OF PEABODY, MASSACHUSETTS.

COMBINED INJECTOR AND EJECTOR.

SPECIFICATION forming part of Letters Patent No. 272,448, dated February 20, 1883.

Application filed April 17, 1882. (Model.)

*To all whom it may concern:*

Be it known that I, GEORGE H. LITTLE, a citizen of the United States, residing at Peabody, in the county of Essex and State of Massachusetts, have invented certain new and useful Improvements in Combined Injectors and Ejectors; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to combined injectors and ejectors, and is an improvement on my patent of July 20, 1875, No. 165,843, reissued February 26, 1878, Nos. 8,104 and 8,105.

The improvements consist in a novel construction and arrangement of the ejector or lifter in such a manner that it discharges the steam or liquid down onto the injector or forcer instead of forcing up into the outlet; in the employment of a segment-cock made in a special manner, so as to open at option either one or two or three ports at once; in a side inlet in the priming-chamber whereby liquids of different kinds or temperatures may be mixed together; in an overflow-cock having ports whereby it may serve or act both for the ejector and for the injector; in a packing-box on the priming-chamber, with a thread cut on the inside of a follower to receive the tube, whereby the tube may be adjusted in position without disturbing the packing or follower, and in other details hereinafter more particularly set forth.

Figure 3:
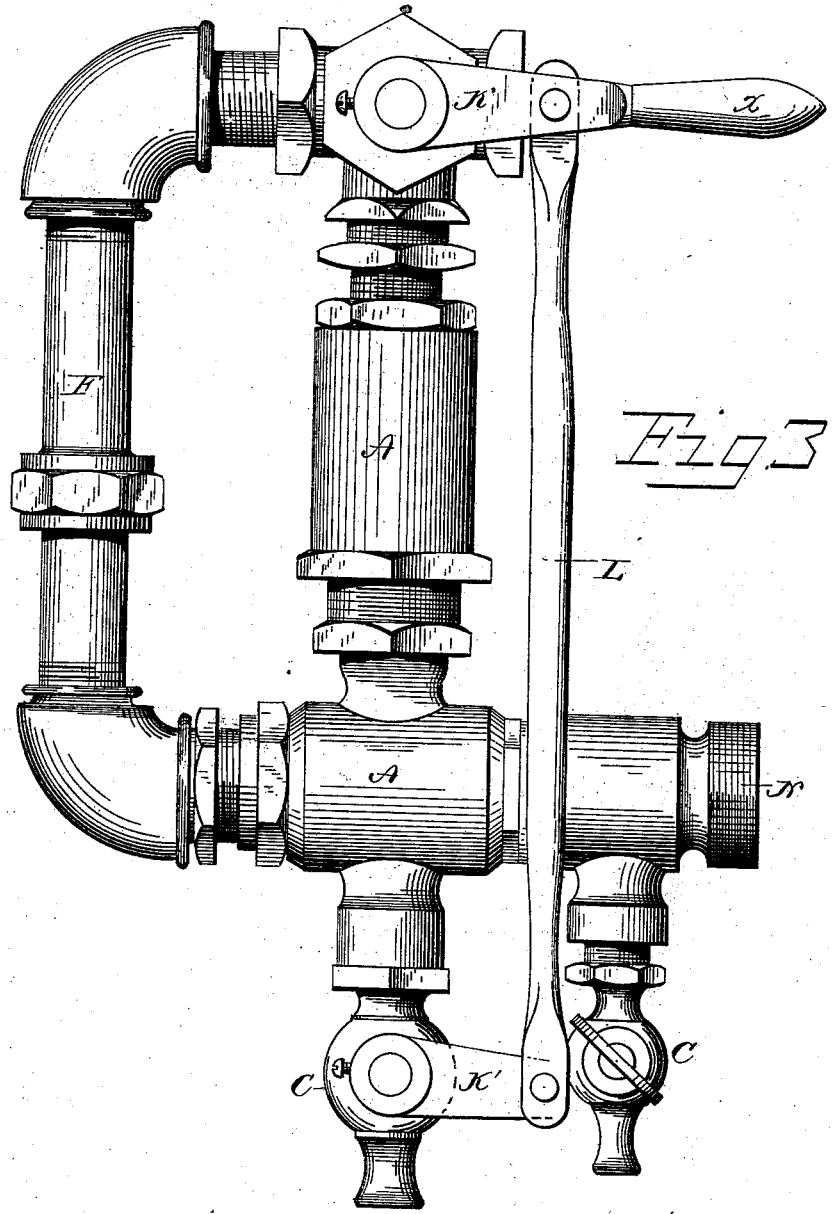
Figure 4:
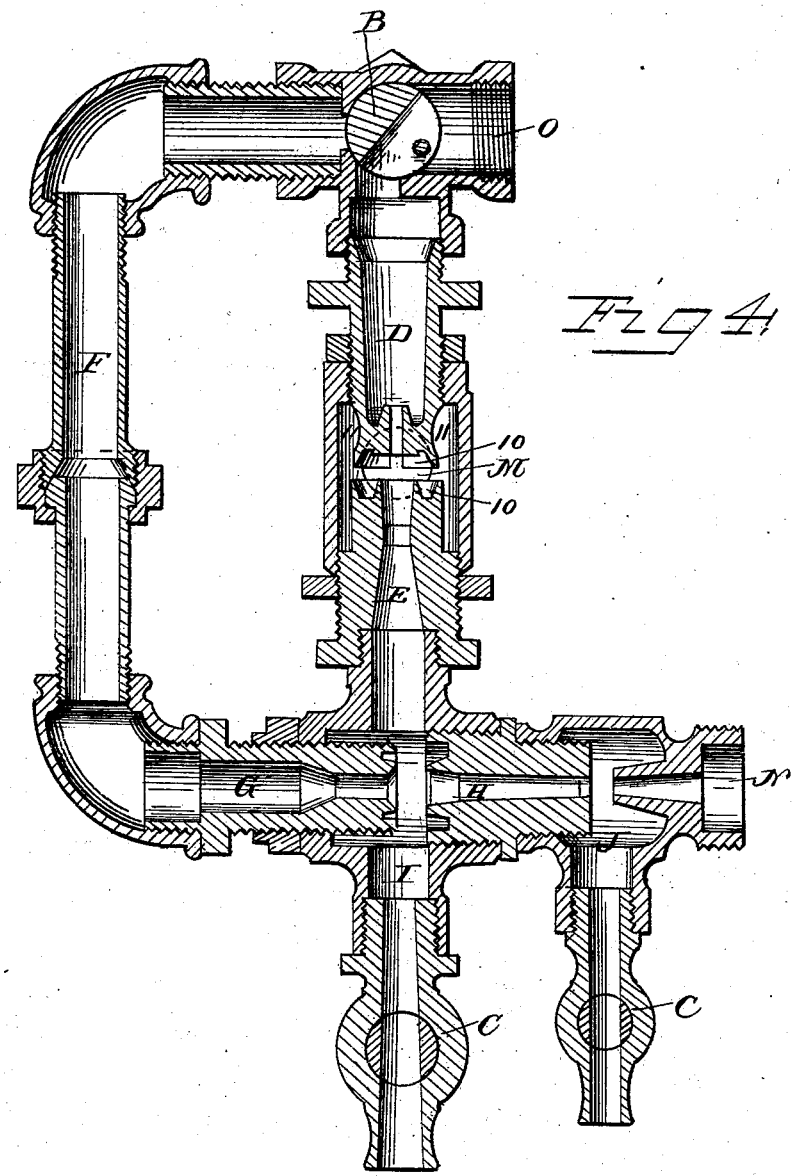

Figure 1 is an elevation. Fig. 2 is a vertical section with the priming-chamber detached; Fig. 2$^a$, a partial section of Fig. 2$^b$, through the line *a a*. Fig. 2$^b$ is similar to Fig. 2, except that an adjustable piece, *x x*, takes the place of the screw-cap *y y*; Figs. 3 and 4, variations in form but embodying the same essential features as in Figs. 1 and 2; Fig. 5, the priming-chamber detached and in section, and Fig. 6 tubes adapted for the apparatus.

A is the body or shell of the apparatus; B, the steam-cock; C, the overflow or vacuum cock; D, the steam-tube of the ejector; E, the outlet-tube of the ejector; F, the steam pipe or tube leading to the injector; G, the steam-tube of the injector; H, the combining-tube of the injector; I, the port through which the steam passes out for creating a vacuum in the ejector; J, the port or overflow-passage for the injector; K, the lever on the steam-cock and provided with a handle; K', a lever on the vacuum or overflow cock, and L the connecting-rod between the two cocks and serving to operate them simultaneously; M, the water-inlet; N, the outlet to the boiler; O, the inlet for admitting steam to the cocks; P, the priming-chamber.

In the reissued Patent No. 8,104, the water-inlet is below and the water has to be forced up to the second jet of steam, when the ejector and injector are worked together, and, whether worked together or independently, the water has to be forced up to the outlet. In my present improved mode of combining the ejector and injector I place the ejector above the injector in such manner and position as to avail myself of the weight of water or attraction of gravitation in connection with the force of steam when the water enters the injector, and one new feature is the using an ejector for feeding the amount of water that passes through the injecter when the water is lifted up into the injector by means of the injector itself.

In the overflow-chamber of the injector (see Figs. 1 and 2) is a partition, Q, into which is screwed the combining-tube H of the injector, and C is the cock in the overflow. This partition reaches down into body of the cock, and its construction is such, as seen in the drawings, that it forms or leaves two ports, I and J, one on each side of the partition, and the plug of this cock is a segment of a cylinder to cover these ports, as desired. These ports serve, one of them for the ejector—that is, for lifting, and the other one for the injector—that, is for forcing.

It will be seen that when the overflow-chamber is screwed into the body of the injector (see Fig. 2) there is a space, R, around the combining-tube H leading to the port I, and when said port is closed the steam or water will pass through this combining-tube and out at the port J.

The combining-tube may be made in various forms, as may also the ejector-tubes, without departing from the spirit of my invention, and I have shown in the drawings several kinds or forms, (see Fig. 6,) and I claim the right to use any of these at option that will best perform the special duty required of it in a given case.

My present invention is a new mode of combining an injector and ejector to work together, both carrying solid jets of steam, each complete in itself, and each worked independently, or both together. When worked together or in combination, the water has one outlet, which connects to the pipe or pipes leading to the boiler or tanks—or, in other words, one machine feeds the other, substantially as shown in Fig. 1 of my reissued Patent No. 8,104, and by the present invention the ejector may be as readily placed above any ordinary injector as that shown in my Reissue No. 8,104 of said patent could be placed below it, and the lifting may, if desired, be done in the injector, the same as shown in my Patent No. 163,876, and reissued May 1, 1877, No. 7,653, or in Reissue No. 8,105, and the ejector be simply used as a feeder.

The priming-chamber P, (see Figs. 1 and 5,) I make with a side inlet, 2, and with an adjustable tube, 3, and with a packing-box, 6, and a locking-nut, 4. The packing-box is on the inside of the case or chamber, and a follower, 5, is employed, having a thread cut on its inner side to receive the threaded tube 3, and thus the position of the tube may be adjusted as desired without in any wise disturbing either the packing 6 or the follower. This priming-chamber has for its objects three important functions: First, it may be used as a primer and filled from a head; secondly, it may be used to take in one kind of liquid at the side inlet and another through the tube; thirdly, water can be taken at 200° up through the tube and cold water taken in at the side inlet, or vice versa, and mixed in such a manner as to maintain a vacuum in the ejector or injector, or in both, dependent upon where it is attached. This priming-chamber may be applied to any other injector or ejector, and may be made in various forms by using a T or a T-cross injector; but I deem the form I have shown the best and productive of the best results.

The segment three-way cock B for letting on steam is similar to that shown in the overflow, one port leading to the ejector and the other to the forcer or injector. These two cocks are made in the form of a segment of a cylinder, the open space therein being preferably of a size sufficient for three passages or ways—namely, one inlet and one or both ports or outlets. This segment plug or cock has its ends cylindrical, as shown, and a strengthening bar or rod, $y$, connects these ends extending across the open space of the cock. A connecting-rod, $L$, connects the operating-levers K and K' of the two cocks; and a lever-handle, $x$, serves to work simultaneously both these cocks—i. e., the steam-cock and overflow-cock.

Other forms of cocks or valves may be employed with my apparatus, provided they be so constructed and applied as to let on or shut off the steam or water flow.

Any or all of the cocks may be made with or without a stuffing-box at either or both ends of the plug.

The packing is held by a cap-nut, and this keeps the cock to place.

It will be seen that I avail myself of the advantage due both to the priming-chamber and to the drafting or auxiliary steam-tube D, both serving to start the supply of water and also to feed the given amount of water required to the injector under different pressures, and of the adjustable tube with its lock-nut and packing-box in the priming-chamber, and also of adjustable and fixed tubes in the injector and ejector, and of the lever and connecting-rod to operate the cocks, all serving to contribute to the performance of the duties required.

*Mode of working my improved combined ejector and injector.*—The cock-levers K K' are set or adjusted so that when the steam-cock is opened to admit steam into the lifter it leaves both ports of the overflow or vacuum cock open. To start the apparatus, first turn the handle $x$ in such manner as to allow steam to pass into the ejector or lifter, and when by this means the water is lifted turn the handle so that the steam may be admitted into the injector or forcer, and this will force the water into the boiler.

The ejector-tubes D E (shown in Fig. 2) are made with interior double tapers, 7 8 and 12 13, and E is made with side inlets, 9, and with a cavity or chamber, 10, in its inlet end. The side inlets serve to admit a second current of water.

The annular cavities or chambers 10 may be made in both the tubes D and E, and they form an additional vacuum-chamber, which communicates with the main vacuum-chamber 11.

The tubes D and E may be made adjustable nearer to or farther from each other, so as to vary the distance of these chambers from each other, and thus regulate the amount of water that may be taken up at that point—that is, between these tubes.

Referring to Figs. 2 and 2ª, the course of the water is as follows: It enters at M, which leads into chamber 11, thence to the ejector-tube E, and thence into the chamber R and through the port I, and when this port I is closed it passes through the injector-tube H into the boiler, as hereinbefore described.

In the modification shown in Figs. 3 and 4 I have shown a few variations in the form of construction, the principle and essential features, however, being the same as those already described. Instead of two ports in the overflow or vacuum cock, I provide one cock in the overflow for the injector and a cock in the injector itself for the use of the ejector at starting, and this latter cock is connected by the lever and connecting-rod with the vacuum or lifting cock. The cock in the overflow of the injector may, if desired, be closed after the injector is at work. The water-inlet M is placed at the sides, and is for the same purpose and performs the same duty as the water-inlet at the bottom of Fig. 2.

Fig. 6 shows modified forms of injector and ejector tubes, and they may be used either in an injector or ejector.

The ejector operates continuously in conjunction with the injector to feed a boiler; but the injector may be worked independently of the ejector, if desired, when on a head of water, by simply letting the steam into the injector and not into the ejector. The ejector has two functions to perform: First, it lifts the water; second, it feeds the amount of water the injector requires under varying pressures of steam, whether the water first be lifted by the ejector or by a tube in the steam-nozzle of the injector, with high steam more water being required than with low steam, so there is no adjustment needed for varying pressures; but in ordinary injectors, with varying pressures, the amount of steam or water has to be varied.

As before stated, the ejector may be applied to any other injector and perform the work of feeding or lifting, as the case may require. Suppose I were using an injector made like that shown in my Patent No. 163,876, dated June 1, 1875, with all the tubes for lifting complete. It works all right in ordinary cases; but if the steam is varying from ten to sixty pounds, and it is accordingly desired to have the injector work on these varying pressures, without any trouble I simply place the ejector as a feeder or governor for the injector, and the two combined work perfectly. Another example: Suppose I have an injector with a quarter-inch hole through it, with overflow and lifting apparatus all complete. I wish to supply the water to it with an ejector. I find it takes an ejector with a three-eighths hole in it to feed the amount of water the injector requires; but I cannot, with the construction of the injector, produce so good a vacuum with the ejector as the mechanical construction for producing the vacuum in the injector, owing to the steam having to pass out through the small hole of the injector before coming out into the air, so I do the lifting in the injector, and simply use the ejector as a feeder or governor.

I claim—

1. A combined injector and ejector in which the ejector feeds the water to the injector, and in which the water thus fed is first lifted to the ejector by means of a tube within the steam-nozzle of the injector, substantially as shown and described.

2. An ejector placed above the injector, as set forth, and having an independent connection with the overflow, and operating to deliver the water from the ejector into the injector, substantially as and for the purpose set forth.

3. An injector or ejector tube having the interior double tapers, 12 13, 7 8, and water-inlets 9 on its side, arranged substantially as and for the purpose shown and described.

4. An injector or ejector tube having interior double tapers, side inlet-openings, arranged as shown, and a cavity or chamber in its inlet end, in combination with a steam-tube having a cavity or chamber in its outlet end, the combination being substantially as and for the purpose described.

5. A partition, Q, in the overflow-chamber, arranged in the manner substantially as shown and described, to afford two passages, I and J, for a three-way cock in the overflow, and serving also to receive and support the combining-tube of the injector.

6. In a priming-chamber, the cap or gland 5 of a stuffing-box, with an internal thread to receive a tube of sufficient length to reach through the packing-box and packing 6, substantially as shown and described.

7. The priming-chamber P, having a side inlet, in combination with the adjustable tube 3, all as and for the purposes described.

8. A priming-chamber provided with two inlets and a nozzle with double tapers, adapted to allow the admission of liquids of two different kinds, or of different temperatures, into the injector or ejector, substantially as set forth.

9. The described method of maintaining the vacuum in the injector or ejector by the mixing of liquids of two different temperatures in the priming-chamber and regulating the relative supplies, substantially as set forth.

10. The shell constructed with an annular chamber around the injector or branch inlet, adapted to connect a pipe or tube for the water-supply, and communicating with the ejector-chamber, substantially as and for the purpose described.

11. The levers K and K', with their connecting-rod, in combination with the three-way cock B and the cock C, and operated as set forth, whereby when one port in the steam-cock begins to open both ports in the overflow-cock are open, and when the steam-ports open to their full capacity the ports in the overflow will be closed.

12. The levers K K', steam-cock B, and vacuum-cock C, in combination with the connecting-rod, arranged and operating as set forth, and whereby the injector will force into the boiler without closing the overflow-cock.

GEORGE H. LITTLE.

Witnesses:
PENNINGTON HALSTED,
CHARLES P. WEBSTER.